(12) United States Patent
Taylor

(10) Patent No.: US 6,472,646 B1
(45) Date of Patent: Oct. 29, 2002

(54) THERMALLY SENSITIVE CONTROLS

(75) Inventor: John Crawshaw Taylor, Isle of Man (GB)

(73) Assignee: Strix Limited, Ronaldsway (IL)

( * ) Notice: Subject to any disclaimer, the term of this patent is extended or adjusted under 35 U.S.C. 154(b) by 0 days.

(21) Appl. No.: 09/646,480

(22) PCT Filed: Mar. 17, 1999

(86) PCT No.: PCT/GB99/00804

§ 371 (c)(1),
(2), (4) Date: Aug. 23, 2001

(87) PCT Pub. No.: WO99/48331

PCT Pub. Date: Sep. 23, 1999

(30) Foreign Application Priority Data

Mar. 17, 1998 (GB) ............................................. 9805750
May 15, 1998 (GB) ............................................. 9810586
Feb. 19, 1999 (GB) ............................................. 9903803

(51) Int. Cl.$^7$ ................................................ H05B 1/02
(52) U.S. Cl. ...................... 219/511; 219/512; 219/481; 337/333; 337/377
(58) Field of Search ................................ 219/212, 511, 219/512, 513, 481, 518; 337/312, 348, 346, 318, 349, 377, 333

(56) References Cited

U.S. PATENT DOCUMENTS 4,188,827 A * 2/1980 Skopil ........................ 219/512
4,288,686 A * 9/1981 Cretors ........................ 219/512
4,337,389 A * 6/1982 Bell ............................ 219/511

FOREIGN PATENT DOCUMENTS

| EP | 0 869 699 A2 | 10/1998 |
| GB | 663490 | 12/1951 |
| GB | 1008134 | 10/1965 |
| GB | 2 064 894 A | 6/1981 |
| GB | 2 283 155 A | 4/1995 |
| GB | 2 322 274 A | 8/1998 |
| WO | WO 98/52447 | 11/1998 |

* cited by examiner

*Primary Examiner*—Mark Paschall
(74) *Attorney, Agent, or Firm*—McCormick, Paulding & Huber LLP

(57) ABSTRACT

A thermally sensitive, overheat protection control for a thick film electric heater comprises a bimetallic actuator (68) arranged for making good thermal contact with the heater, and a moveable electrical contact (78) for engagement with a contact provided on the heater. The moveable contact (78) is operatively coupled to the bimetallic actuator (68) such that in use upon operation of the actuator, it moves out of engagement with the heater contact to interrupt the electrical supply to the heater. The bimetallic actuator (68) and the moveable contact are mounted on a common generally U-shaped leaf spring (66) which acts in use resiliently to bias the actuator (68) into thermal contact with the heater and the moveable contact (78) into electrical contact therewith. The control also comprises a creep action bimetallic actuator (110) mounting a contact at one end, the actuator acting as a thermostatic control for the heater.

26 Claims, 12 Drawing Sheets

THERMALLY SENSITIVE CONTROLS

BACKGROUND OF THE INVENTION

1. Technical Field

The present invention relates to thermally sensitive controls for electric heaters, and more particularly for thick film electric heaters used in liquid heating vessels.

2. Background Information

So called thick film electric heaters comprise an electrically resistive heating track deposited, for example printed, onto an electrically insulating substrate provided typically as a ceramic or an insulated metallic support plate. In liquid heating vessels the metallic support plate may be formed by the base of the vessel itself, or by a plate mounted in an opening in the base of the vessel. Examples of such heaters are shown, for example in WO96/18331 and WO96/17497.

Typically the heating track has a tortuous path terminating in a pair of terminals through which power is supplied to the track. The power supply to the track is normally controlled by a thermally sensitive control which acts to open a set of contacts in the control to disconnect the power supply to the track in the event, for example, that the heater overheats. Power leads may be soldered on to the terminals and connected to the control, or as shown in GB-A-2283156 the thermally sensitive control may be provided with sprung contacts which make electrical connection with the terminals when the control is mounted to the heater.

A recent proposal by the Applicant in GB 2322274 is to use the contact provided on the heater as one of a pair of switch contacts, the other contact being provided in a control or control unit mounted against the heater. In the event that the heater overheats, a bimetallic actuator arranged in good thermal contact with the heater operates to lift the control contact from the heater contact to interrupt the supply of energy to the heater, thereby preventing serious overheating of the heater and possible damage to the liquid heating vessel.

In the earlier proposals, the control mounted contact and the bimetallic actuator are separately mounted in the control. This, however, is inefficient in terms of assembly tolerance and costs. The present invention seeks to overcome these drawbacks.

DISCLOSURE OF THE INVENTION

From a first aspect, therefore, the invention provides a thermally sensitive control for a thick film electric heater comprising a bimetallic actuator arranged for making good thermal contact with the heater, and a movable electrical contact for engagement with a contact provided on the heater, said movable contact being operatively coupled to the bimetallic actuator such that in use upon operation of the actuator, it moves out of engagement with the heater contact to interrupt the electrical supply to the heater, said bimetallic actuator and said movable contact being mounted on common leaf spring means which act in use resiliently to bias the actuator into thermal contact with the heater and the movable contact into electrical contact therewith.

Thus in accordance with this aspect of the invention, the need for separate mountings for the movable contact and actuator is avoided, and a common leaf spring is used both to mount the actuator and contacts and resiliently to bias them respectively into thermal and electrical contact with the heater. The leaf spring means thus performs a dual function, avoiding duplication of parts. Furthermore, the contact and actuator may be preassembled before being mounted in a control unit, for example, thereby reducing assembly times and costs. It also allows accurate positioning of the respective components relative to each other. Furthermore, the leaf spring will have a relatively low thermal capacity, thereby reducing the amount of heat drawn out of the actuator so improving its thermal response.

The invention also extends to such a preassembly, so from a second aspect, the invention provides an assembly for use in a thermally sensitive control for a thick film electric heater, the assembly comprising a bimetallic actuator, and a movable electrical contact, said bimetallic actuator and said contact being mounted on common leaf spring means which in use act to resiliently to bias the actuator into thermal contact with the heater and the movable contact into electrical contact therewith.

The leaf spring means may in a simple embodiment comprise a single limbed leaf spring, with the actuator and contact mounted to different mounting locations on the leaf spring. In the preferred embodiment, however, the leaf spring means may comprise a leaf spring having at least two connected limbs mounting respectively the actuator and contact. This is preferred so that the biasing force of the respective components can be tailored to suit the required conditions by choosing the appropriate spring force in each limb.

Preferably the actuator is a bimetallic actuator, preferably a snap acting actuator, and most preferably one of the type described in GB1542252.

In the case of such an actuator, the actuator may typically be biased against the heater with a spring force of 25 g, although lower forces may be used. A biasing force of 25 g will ensure good thermal contact between the actuator and the heater and allow for thermal distortion of the heater, but is not so great as to change the operating characteristics of the actuator. The actuator is preferably mounted by its tongue on the leaf spring member, so as to engage the heater around its periphery, thereby giving a large area of thermal contact while avoiding the need for heat sink compound, which is expensive.

The contact force should be sufficient to ensure a good electrical contact between the movable contact and the heater contact, but not so large that it cannot be overcome by the actuator. For a pure silver contact, a contact force of log is adequate for electrical contact purposes, and easily overcome by the actuator operating force, which typically is in the region of 250 g. For silver alloy contacts, a higher spring force would be necessary for a satisfactory electrical contact.

In the preferred embodiment, the leaf spring member is generally U-shaped, with the contact and actuator mounted on the respective side limbs of the U. The limb mounting the contact member is preferably arranged so as to overlap a movable portion of the actuator such that when the actuator moves, it moves the contact mounting leg to move the contact. The contact carrying limb may have a folded up tab for engaging the actuator, thereby minimising the movement of the actuator required to lift the contact, and obviating the need for a separate push rod or the like to transmit the movement of the actuator to the movable contact, thereby reducing material and assembly costs.

The leaf spring member, and more particularly the base limb of the U shaped spring member may be formed with means to mount it in a control housing. For example, it may be provided with a resilient bow for fitting in a complementary slot in a control housing.

The leaf spring member is preferably also provided with a terminal, for example a spade terminal to allow its easy connection to an external power supply, for example a connector provided on the end of a wire of a power cable.

The leaf spring member can, as has been said above, be mounted in a control housing itself mounted to the heater or the liquid heating vessel. In other embodiments, however, it may be mounted directly, eg by bonding, to the heater itself, or by rivetting to a separate terminal piece.

The invention also extends to a combination of a control or assembly of the invention in combination with a thick film heater.

As mentioned above, having a separately mounted spring contact and bimetallic actuator does have the disadvantage of being inefficient from the point of view of assembly tolerances and costs, these disadvantages may be mitigated, to some extent, by having the separate components commonly mounted. For example, the respective components may be commonly mounted over one or more mounting posts so that they may be secured by common retaining means e.g. screws, nuts, rivets and so on, or, for example push fitted into a common mounting location.

Thus, compared to the embodiment described earlier, the connecting limb of the common leaf spring means may be substituted by two separate mounting limbs which engage common mounting means. The mounting limbs may conveniently overlap.

From a further broad aspect, therefore, there is provided a thermally sensitive control for a thick film electric heater comprising a bimetallic actuator arranged for making good thermal contact with the heater, and a movable electrical contact for engagement with an contact provided on the heater, said movable contact being operatively coupled to the bimetallic actuator such that in use upon operation of the actuator, it moves out of engagement with the heater contact to interrupt the electrical supply to the heater, said bimetallic actuator and said movable contact being mounted on commonly mounted leaf spring means which act in use resiliently to bias the actuator into thermal contact with the heater and the movable contact into electrical contact therewith.

As in the earlier embodiment discussed, the leaf springs may be mounted in a control housing or directly to the heater itself.

The control of the invention may be most advantageously employed as an overheat protector for a thick film heater, operating when the heater overheats, for example in the event that the heater vessel boils dry or is switched on dry. However, it may also be used as a boiling control, in which case the actuator is positioned at a part of the heater which will rise in temperature locally when liquid in the vessel boils, e.g arrangements as described in GB2283155 or WO 97/04694.

The control described may be employed in vessels which will only heat liquid to boiling, or in thermostatically controlled vessels. If, for example, the vessel is required only to boil water, an overheat protector in accordance with the invention may be arranged in one pole of the supply to the heater and the other pole of the supply may be connected directly to another terminal of the heater. This may most easily be effected through a leaf spring mounted contact biased into contact with a terminal of the heater track. However, if a thermostatically controlled vessel is required a thermostatic control can be incorporated in the other pole of the supply.

The invention also seeks to provide a simple thermostatic control for a liquid heating vessel having a thick film heater, and so from a further aspect, the invention provides a thermostatic control for a liquid heating vessel having a thick film electric heater comprising a current carrying creep action bimetallic actuator mounting an electrical contact which in use makes contact with a contact provided on the heater, the arrangement being such that in use as liquid in the vessel is heated, the actuator heats and deflects such that at or around a desired temperature it will deflect to such an extent as to lift the actuator mounted contact from the heater contact to interrupt the power supply to the heater.

With such an arrangement, the actuator will initially bias the contact into contact with the heater contact and as it heats, through a combination of the current flow through the actuator itself and heat received from the heater, it will move so as initially to reduce the contact pressure and eventually, at or around the desired liquid temperature, open the contacts, thereby interrupting the electrical supply to the heater. As liquid in the vessel cools, so too will the bimetallic actuator, and it will eventually deflect back towards its initial configuration so as once again to close the contacts and reconnect the electrical supply to the heater thereby allowing the liquid in the vessel to be reheated. This cycle will continue to maintain the liquid at a desired given temperature.

Preferably, means are provided for varying the operating temperature of the control. This is achieved in the preferred embodiment by providing means for varying the biasing force of the actuator towards the heater, and thus the temperature at which deflection of the actuator will be sufficient to open the contacts. Such biasing means preferably comprises a spring acting on the bimetallic actuator and means for varying the force exerted by the spring on the actuator. Most preferably, the spring means comprises a leaf spring and preferably the means for varying the spring force comprises a cam, most preferably a rotary cam, acting to deflect the spring from an initial position.

The thermostatic control may also act as an on/off switch for the vessel in that in one position of the control cam, the actuator mounted contact is spaced away from the corresponding heater contact. Movement of the cam from this position then moves the bimetallic actuator so as to close the contacts, the spring force applied to the actuator via the leaf spring then determining the opening temperature.

As in the control discussed earlier, the bimetallic actuator is preferably provided with means to mount it in a control housing and also with terminals means to allow easy connection to a wire of a power cord.

Preferably the various control components described above are all mounted in a tray-like control housing which can then be mounted to the bottom of the liquid heating vessel so as to make electrical and thermal connection with the heater at the same time.

It will be appreciated that the invention also extends to a thick film heater in combination with a control of the invention and also to a liquid heating apparatus, for example a liquid heating vessel or container comprising such a combination.

As was stated earlier, the spring mounted arrangement according to the first aspect of the invention may be used as a dry switch on protector, as a boiling control, and/or in conjunction with a thermostatic control.

It would of course be possible to use the spring mounted actuator/contact arrangement as a simple thermostatic control, by choosing an appropriate operating temperature for the actuator. With such an arrangement, as the actuator heats and cools, it operates alternately to raise and lower the contact from the heater, thereby cycling the power to the heater.

Thus, an arrangement may be envisaged in which, in the variable thermostatic embodiment described above, the variable thermostat is replaced with a spring mounted actuator as described earlier.

Where a thermostatic control is not required, it may still be desirable to provide a double level of overheat protection for the heater. This can easily be achieved by using two spring mounted actuator assemblies in accordance with the invention, set to operate at a suitable temperature.

The actuators are preferably set to operate at generally the same temperature, within normal manufacturing tolerances, i.e. within 25°–30° C. of one another.

Preferably the assemblies are arranged in the respective poles of the supply to the heater.

The actuator/contact assembly or assemblies may be adapted and arranged so as to reset automatically when the actuator temperature falls below a predetermined value, thereby continually cycling the power supply to the heater. However, the assemblies may also be adapted so as to require manual resetting after operation. To this end, operation of the actuator may act to trip a spring loaded lever which maintains the spring mounted contact away from the heater contact until it is manually reset by a user. For example, the contact mounting spring or a member coupled thereto may act on the trip lever so as to trip it. Alternatively, however, the actuator may first act on the trip lever, movement of the lever then acting to move the contact.

In the double actuator/contact assembly arrangements described above, the actuators may be arranged so that operation of one or other of the actuators operates the trip lever, thereby ensuring that both contacts are lifted from the heater.

The trip lever may be coupled to an operating knob or the like for operation by a user, and it can act as an on/off switch for the heater.

The trip lever may be associated with a steam sensitive actuator which, upon boiling of liquid in the vessel, acts to trip the trip lever and open the contact (s). An example of the association of steam sensitive actuator with a trip lever is disclosed in WO95/34187 to which further reference may be made for further detail.

It is usual in electric liquid heating appliances to provide a neon or other power indicator for the purpose of showing that the heater of the vessel is being energised. In the above embodiment where switching occurs effectively directly onto the track, it is difficult to provide a power supply to the indicator which will indicate whether the heater is energised. This can, however, be overcome by making the neon connections to the heater whereby should power supply to the heater be discontinued, the neon or other indicator will not be illuminated.

This could be effected by making hard wired connections to appropriate contact regions of the heater but in a preferred embodiment resilient indicator contacts are provided on the control unit which make electric contact with an appropriate part of the heater when the control is mounted thereto.

Preferably the contacts provided on the control comprise leaf springs.

Most conveniently, the indicator contact on the heater is provided at substantially the same potential as the main switching contact. Accordingly the heater indicator contact may be connected electrically to the heater switch contact by a low resistance material such as silver. Most easily, a double contact arrangement can be provided at each end of the heater track, whereby the indicator, when operational, is connected in parallel with the heater track.

From a further broad aspect, therefore, the present invention provides a thick film heater having a thick film track with terminal means which are connected, in use, to a power supply indicator.

From a yet further aspect, the invention provides a thermally sensitive control unit for a thick film heater, said control unit having resilient indicator contact means for engagement with indicator contact regions on the heater.

A control of the invention may be integrated with an electrical connector for the heater, preferably a cordless electrical connector and most preferably one which engages with a base unit connector in any relative angular orientation. Such a connector is disclosed in WO95/08204, to which further reference may be made for constructional details of such a connector.

Preferably the control comprises a moulded body to which the control components are mounted. In the preferred embodiment one or more of the contact mounting leaf springs is joined directly to a respective terminal of the connector.

From a yet further broad aspect the invention provides an integrated electrical connector and control unit for a thick film electric heater comprising an electrical connector having a connector body housing terminals for engagement with terminals in a complementary connector and, mounted on top of said connector body, and extending laterally therefrom, a leaf spring mounting a contact for making electrical connection to the heater, and a bimetallic actuator for making good thermal contact with the heater.

Most preferably the bimetallic actuator is spring mounted, and most preferably the contact and the bimetallic actuators are provided on common spring means as described above.

BRIEF DESCRIPTION OF THE DRAWINGS

Some preferred embodiment of the invention will now be described by way of example only, with reference to the accompanying drawings in which.

DETAILED DESCRIPTION OF THE INVENTION

Figure 1:
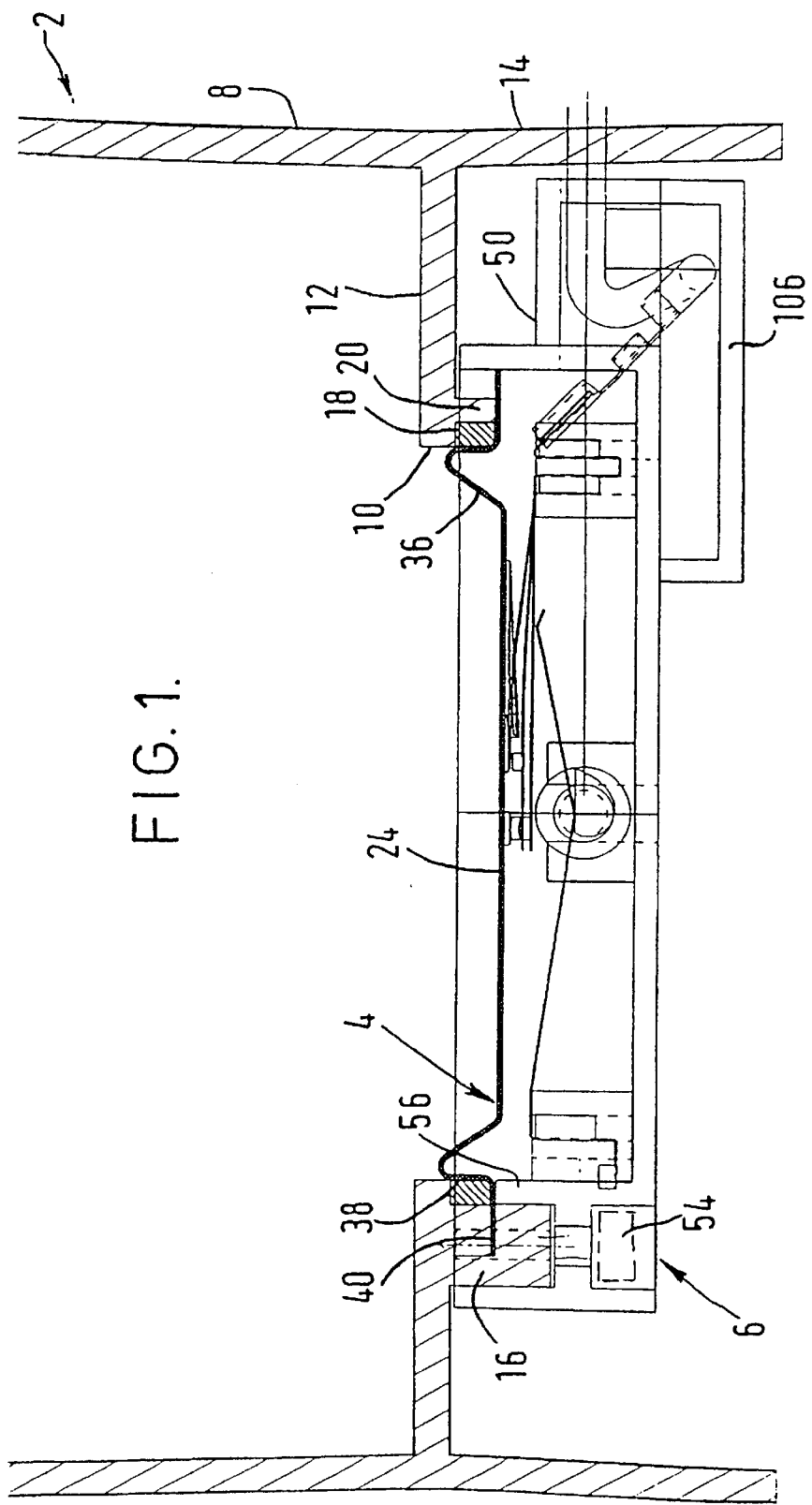
FIG. 1 is a schematic sectional view showing a control unit in accordance with the invention mounted with a thick film heater in the bottom of a liquid heating vessel.

With reference to FIG. 1, a water heating vessel 2 is provided with a thick film plate heater 4 and a thermally sensitive control unit 6.

The vessel 2, for example a hot water jug comprises a plastics body 8 having an aperture 10 formed in the base part 12 thereof. The base part 12 is formed with a skirt 14, three internally threaded mounting bosses 16, a radial sealing flange 18 and a depending sealing flange 20.

Figure 2:
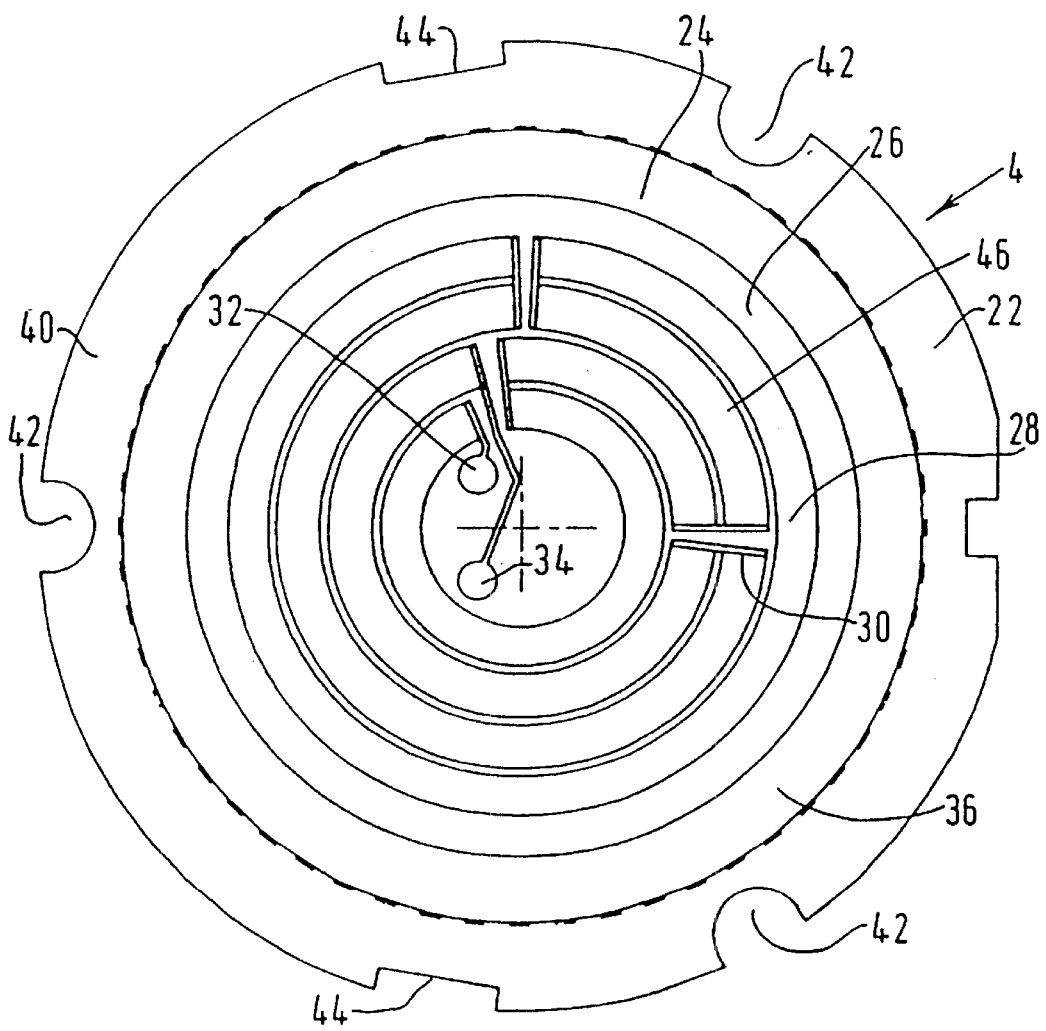
FIG. 2 is a plan view of the thick film heater shown in FIG. 1.

The thick film plate heater 4, which is shown in greater detail in FIG. 2 comprises a metallic plate 22 having a flat central portion 24 on which is provided an insulating layer 26 and a thick film resistive heating track 28 in a known manner. A protective overglaze (not shown) is also provided over the heating track in a known manner. The heating track 28 is formed as a series of parallel sections whose ends are interconnected by bridges 30 of silver or other low resistance material. The respective ends of the track are provided with electrical contacts 32, 34, which may, for example be contacts bonded onto the terminal pads of the track 28. The plate 22 is provided with a stiffening rim 36, formed with respective peripheral flanges 38, 40 (FIG. 1). The radially extending flange is provided with semi-circular scallops 42 for engagement over the vessel mounting bosses 16 and with slots 44 for locating with complementary formations on the control unit 6.

Figure 4:
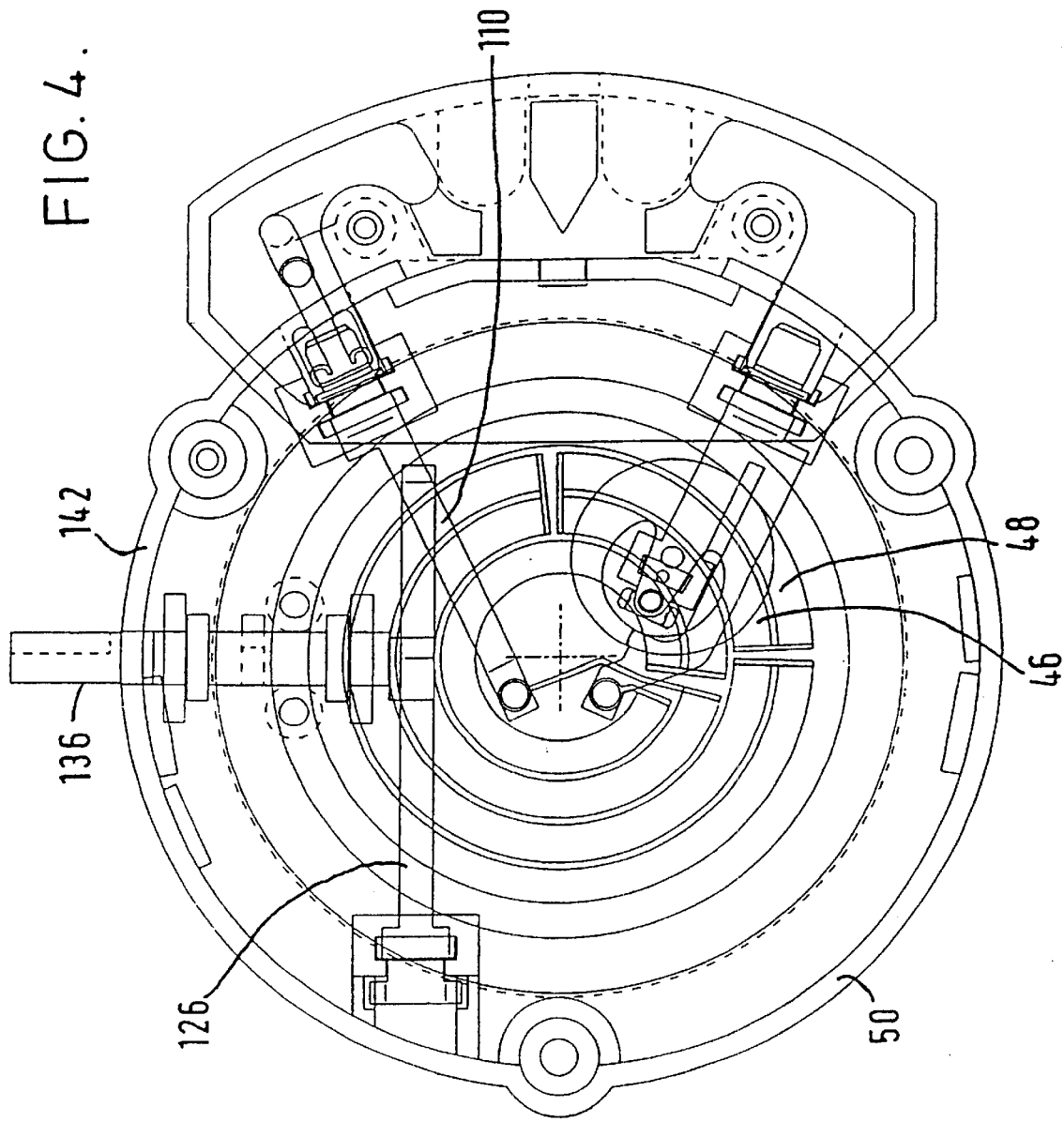
FIG. 4 is a plan view of the control unit of FIG. 2 and the heater of FIG. 3 assembled together, but with the details of the control visible to assist in understanding how the operative parts of the heater and the control are arranged relative to each other.
Figure 5:
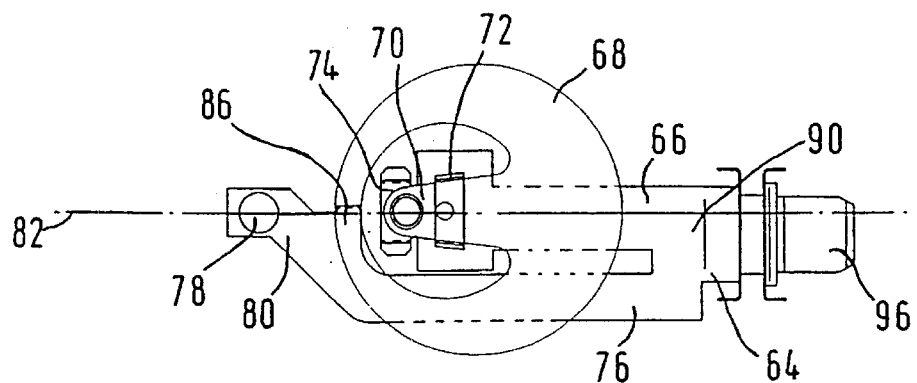
FIG. 5 is a plan view of a subassembly of the control unit of FIG. 2.
Figure 6:
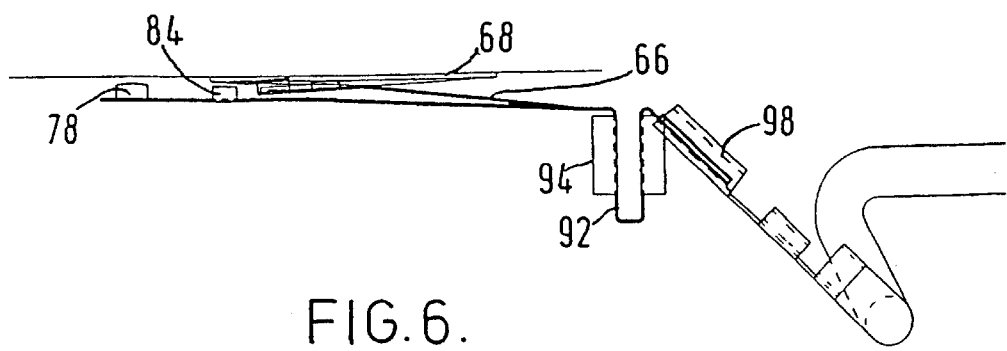
FIG. 6 is a side view of the subassembly of FIG. 5.

The track 28 is provided with a region 46 which is formed by a series of short track sections 48. As can be seen in FIG. 4, this region is intended to receive the actuator 68 of an overheat protector 62, and is configured to minimise the potential drop in the track across the area of the actuator 68, thereby discouraging shorting of the track 28 to the actuator 68 through the protective overglaze of the heater.

The heater 4 is clamped in the aperture 10 by the control unit 6. In particular, the control unit 6 comprises a tray-like plastics moulded housing 50, which has three peripherally arranged bores 52 for receiving the vessel mounting bosses 16 and mounting screws 54. The inner wall 56 of each bore 52 is relieved so as to engage the lower face of the radially extending heater flange 40 and so compress a seal 56 between the flanges 38, 40 of the heater plate and those 18,20 of the vessel body 12, as the screws 54 are tightened.

Referring now in greater detail to FIGS. 3 to 7, the control unit 6 comprises an overheat protector 60 and a thermostatic control 62 whose construction and operation will be described below.

The overheat protector 60 comprises a generally U-shaped leaf spring 64. One limb 66 of the leaf spring 64 mounts a snap acting bimetallic actuator 68 of the kind described in GB 1542252. The construction and operation of such actuators is extremely well known in the art and need not be described further here. In particular, the tongue 70 of the actuator 68 is received in a raised slot 72 formed in the limb 66. As can be seen from FIGS. 1 and 6, the limb 66 is not planar, but is bent downwardly towards its free end 74 so as to facilitate proper engagement of the actuator 68 with the heater 4, with the periphery of the actuator 68 engaging the heater.

The other limb 76 of the leaf spring member 64 mounts a silver contact 78 on its free end 80. In use this contact 78 makes electrical connection to the track contact 32. The free end 80 of the limb 76 extends inwardly toward the other limb 66 such that the contact 78 is generally aligned on the axis 82 of the leg 66. A tab 84 is folded up out of the limb 76 for positioning closely under a movable peripheral part 86 of the actuator 68.

The cross limb 90 of the leaf spring member 64 is formed with a deep bend 92 for location within a mounting block 94 provided in the control housing 50. The end of the cross member 90 is formed as a spade terminal 96 for connection to a mating terminal 98 provided on one wire 100 of a power lead 102, suitably clamped by clamps 104. The clamps 104 are at least partly formed in a cover moulding 106 which is screwed onto the bottom of the moulding 50 via countersunk bores 108.

Figure 3:
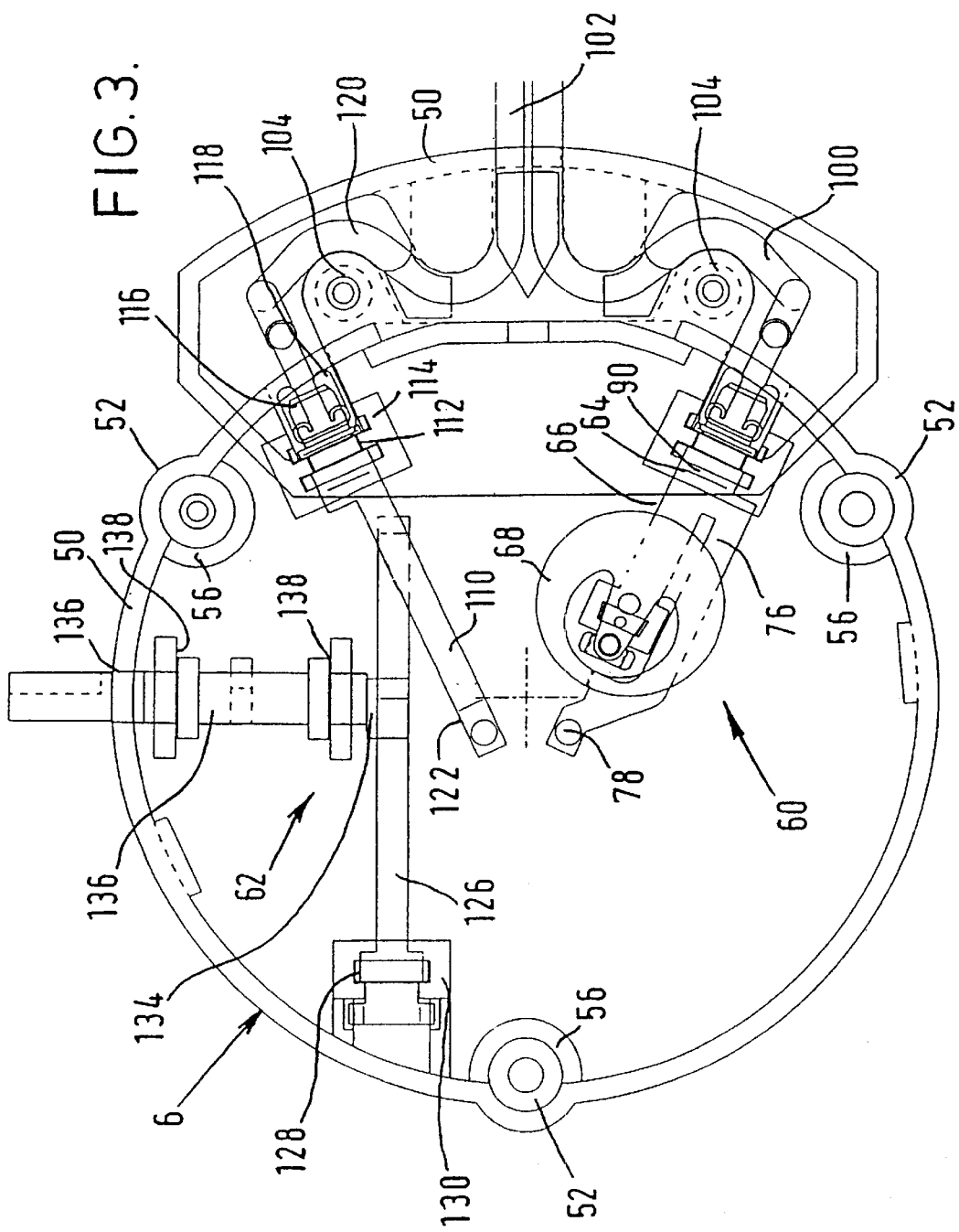
FIG. 3 is a plan view of the control unit shown in FIG. 1 looking at the face of the control unit which in use will engage the heater.

It will be seen from FIGS. 1 and 3 that in use, the actuator 68 will be biased against the region 46 of the heater track 28 by the leg 66 of the leaf spring member 64. The biasing force is typically in the region of 25 g, which is sufficient to ensure and maintain good thermal contact with the heater 4 even with thermal distortion of the heater 4. The contact 78 is also biased against the heater contact 34 by the spring limb 76, typically with a spring force of about 10 g.

In the event that the heater overheats, in say the event of the vessel boiling dry or being switched on without containing water, the actuator 68 will operate, typically at a temperature of 135–150° C. As it does so, it reverses its curvature, causing the peripheral portion 86 to move into contact with the tab 84 of the contact mounting limb 76, causing the limb 76 to deflect downwardly and open the contact pair 32, 78, thereby interrupting the supply of energy to the heater. When the heater has cooled sufficiently, the actuator 68 will reset, thereby allowing the contacts 34, 78 to close, so as once again to supply energy to the heater 4. This cycle of operation will continue until the vessel is switched off or more water is added to the vessel.

Turning now to the thermostatic control 62, this comprises a generally planar creep action bimetallic actuator 110 mounted at one end 112 in a mounting block 114 provided in the control housing 50. That end 112 of the actuator is also formed with a spade connector 116 for connection to a connector 118 provided on the end of the other wire 120 of the power lead 102. The free end 122 of the actuator 110 mounts a contact member 110 which in use makes electrical connection to the track contact 34.

The actuator 110 is urged towards the heater 4 in use by a bent leaf spring 126 which is mounted at one end 128 in a mounting block 130 provided in the control housing 50. The free end 132 of the leaf spring 126 abuts the underside of the actuator 110. The leaf spring 126 is deflected into greater or lesser engagement with the actuator 110 by means of a rotary cam 134 mounted on the end of a control shaft 136 received in journals 138 provided in the control housing 50, and which engages the bent portion 140 of the leaf spring 126. The shaft 136 extends through a slot formed in the outer wall 142 of the control housing for receiving a control knob (not shown)

Figure 7:
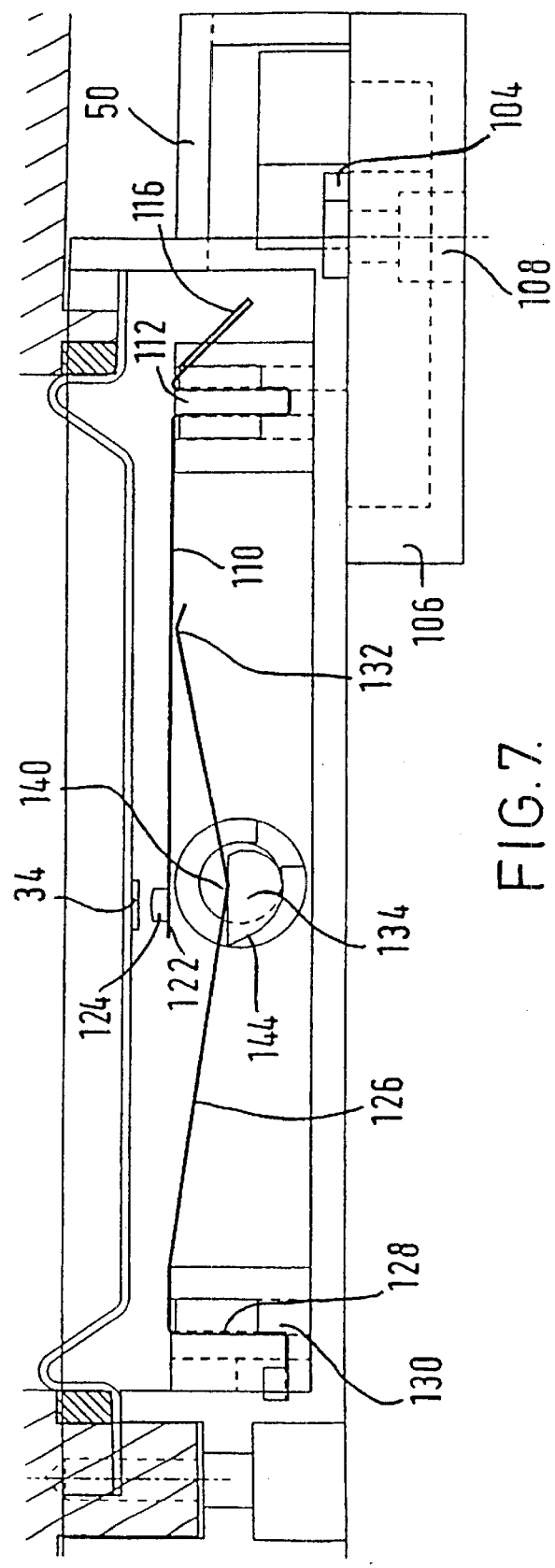
FIG. 7 is a side elevation of other components of the control unit.

In the condition shown in FIG. 7, the cam 134 is in an 'off' position, with the leaf spring 126 not pressing substantially on the actuator 110. In this position, the contacts 124, 34 are open, and the heater deenergised. However, as the cam 134 is rotated in an anticlockwise direction (in the sense of FIG. 7), the cam surface 144 will deflect the spring 126 and urge it resiliently into contact with the actuator 110. The first step movement of the cam 134 will cause the actuator contact 124 to move into contact with the heater contact 34, thereby allowing energy to be supplied to the heater. As the cam 134 is rotated further, the leaf spring 126 urges the actuator 110 further towards the heater 4. As the liquid in the vessel heats, heat will be transferred to the actuator 110, which as it heats will try to deflect away from the heater 4 to open the contacts 34,124. However, to do this, the actuator 110 must overcome the spring force, and the higher the spring force, the higher the actuator temperature must be to overcome the spring force. When the requisite temperature has been reached, the contacts 34,124 will open and the electrical supply to the heater be interrupted. As the liquid in the vessel cools, so will the actuator 110, and eventually it will deflect back sufficiently far to close the contacts 34,124 once again thereby reconnecting the electrical supply. In tests conducted on a 110V, 750 W heater, it has been found that once the liquid in the vessel is at temperature, the control will typically cycle at about 0.5 s on, 10 s off, the rapid switch off being due to the heating effect of the current (7A) passing through the actuator, rather than the rise in temperature of the liquid in the vessel.

The control settings to obtain a desired liquid temperature can be determined empirically, but it will be seen that temperatures up to and including boiling can be achieved with the thermostatic control described.

It will be appreciated that the overheat protection control 60 and thermostatic control 62 described above may be employed independently. However, when combined in the manner described they provide a versatile but simple control structure.

Figure 8:
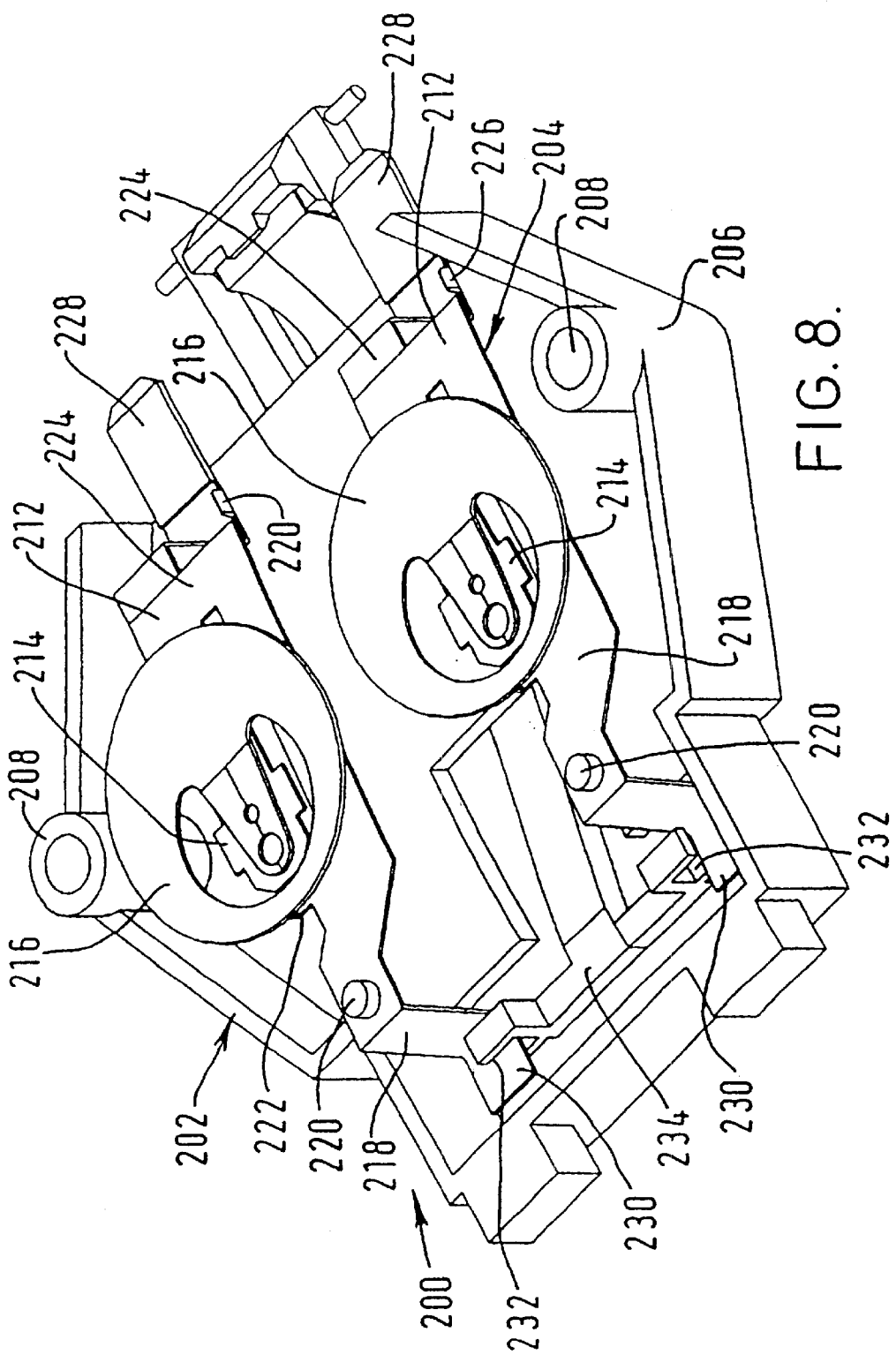
FIG. 8 is a first perspective view of a second embodiment of the invention.
Figure 9:
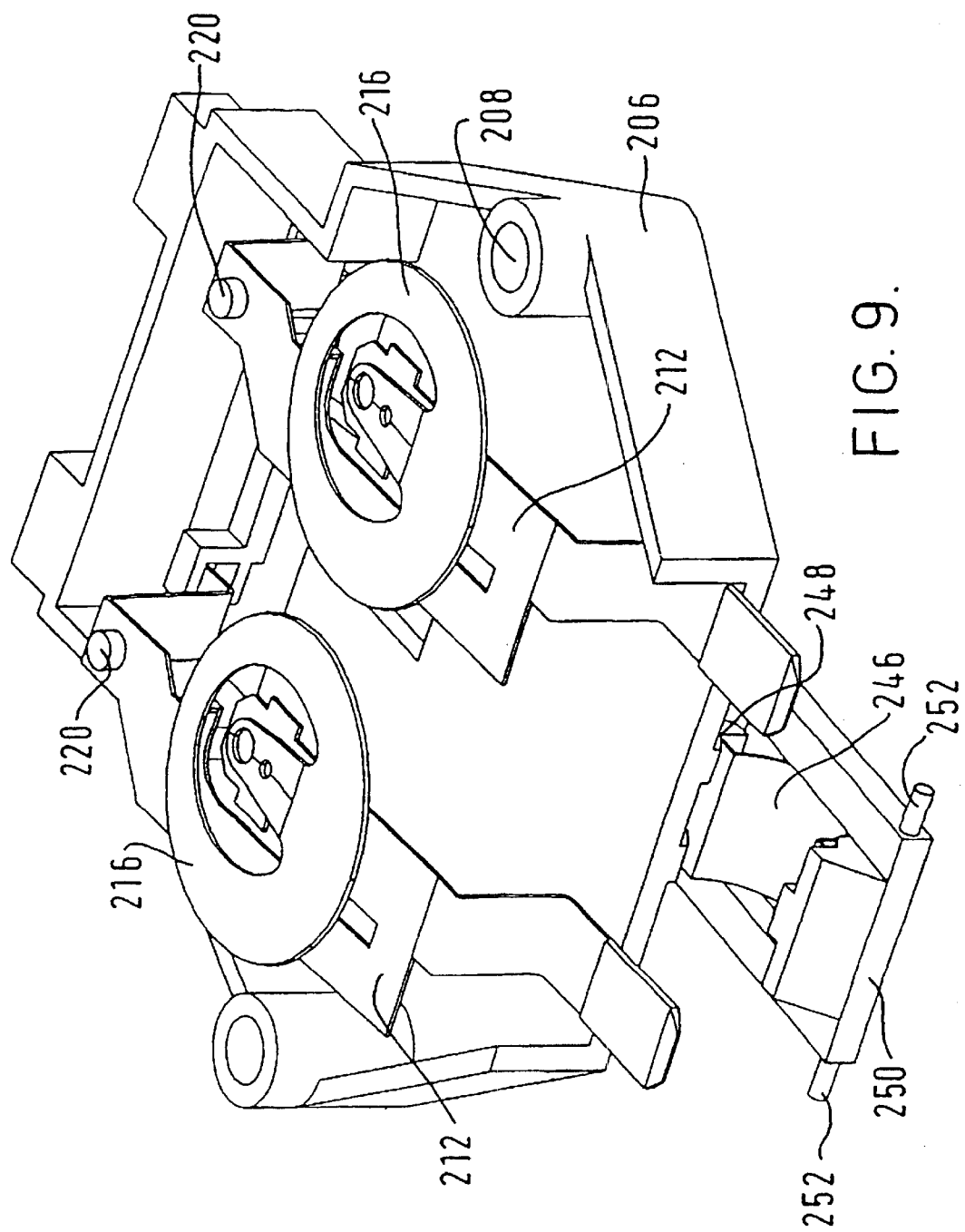
FIG. 9 is a second perspective view of the embodiment of FIG. 8.
Figure 10:
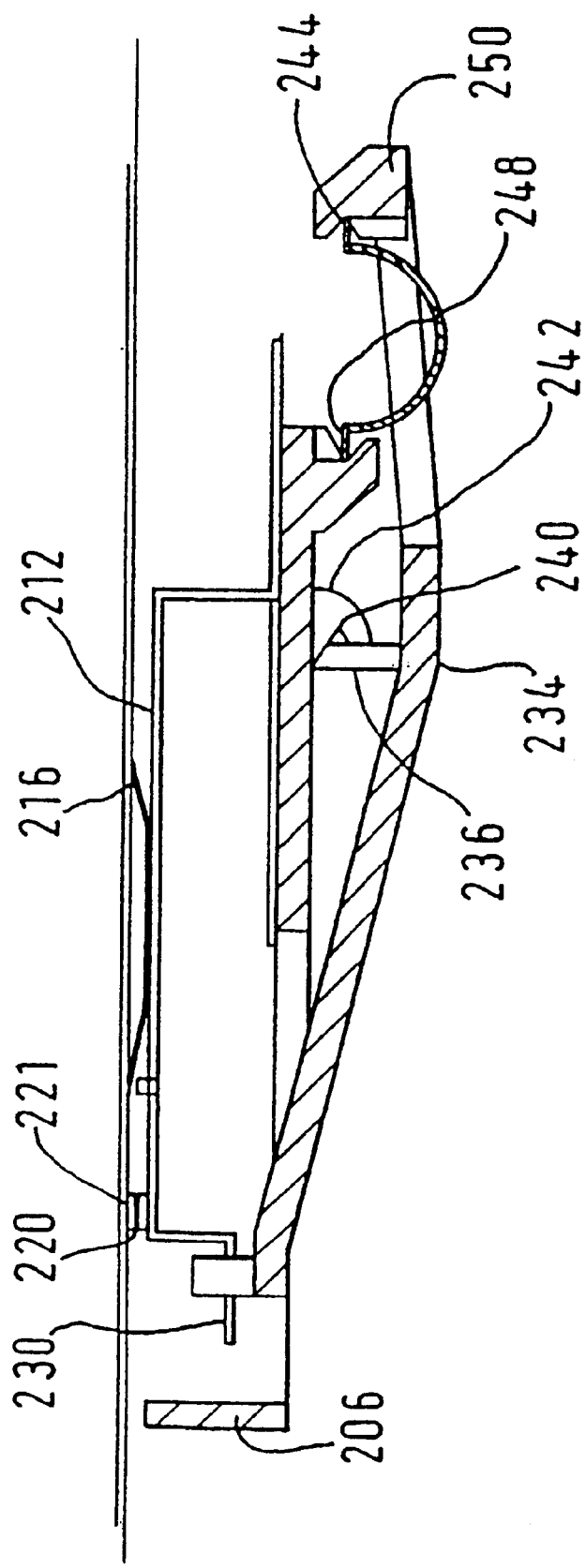
FIG. 10 is a section along line I—I of FIG. 8.

With reference to FIGS. 8 to 10, a further embodiment of the invention is described, again for use with a thick film plate heater, similar to that shown in the earlier embodiment.

The control unit 200 shown in FIGS. 8 to 10 is a double pole overheat protector, comprising first and second overheat protectors 202,204 mounted on a tray-like moulded plastics housing 206. The protectors are arranged in the respective poles of the electrical supply to the heater. The housing 206 is moulded with mounting bores 208 for receiving screws, studs, or the like (not shown) which mount the control unit 200 to the heater or to a support for the heater.

Each overheat protector 202,204 has substantially the same construction as the protector 60 of the first embodiment described above. Thus each protector comprises a generally U-shaped leaf spring 212, one limb 214 of which mounts a snap acting bimetallic actuator 216 of the kind described in GB 1542252. Each actuator 216 has the same nominal operating temperature typically 135°–150° C. As in the earlier embodiment, the limb 214 is not planar, but is bent at its free end so as to facilitate proper engagement of the actuator 216 with the heater, to ensure good thermal contact between the actuator and the heater.

The other limb 218 of each leaf spring member 212 mounts a silver contact 220 which, in use, makes electrical connection to a respective track contact 221. A tab 222 is folded up from the limb 218 for positioning closely under a movable peripheral part of the actuator 220.

The cross limb 224 of each leaf spring member 212 is formed as shown for location within mounting clips 226 provided in the moulding 206. The end of each cross member 224 is formed as a spade terminal 228 for connection to a mating terminal provided on a power supply lead (not shown).

The contact mounting limb 218 of each leaf spring member 212 is formed with an extension 230, which engages, with clearance, in slots 232 formed in one end of a trip lever 234. As can be seen most clearly from FIG. 10, the trip lever 234 is mounted to the underside of the moulding 206. In particular the trip lever 234 is provided with laterally spaced upstanding pillars 236 having projecting knife edges 238 which engage in grooves 240 provided in projecting parts 242 of the moulding 206. The other end of the trip lever 234 is provided with a groove 244 which receives one end of a C spring 246. The other end 250 of the C spring 246 is received in a groove 248 provided in the moulding 206.

The end 250 of the trip lever 234 is provided with a pair of mounting lugs 252 which receive a knob (not shown) which in use extends to a position where it can be manipulated by a user.

The trip lever mechanism above acts to prevent cycling of the control during operation and also as an on-off mechanism, as will now be discussed further in the description of the mode of operation of the control unit.

In use, each respective actuators 216 will be biased against the heater by the leg 214 of the respective leaf spring member 212 and the contacts 220 biased against the heater by the spring limbs 218. During normal operation of the heater, the respective contacts pairs 220,221 remain closed and power is supplied to the heater. In the event that the heater overheats, one or other of the actuators 216 will reach its operating temperature, reverse its curvature with a snap action, and cause the limb 218 to deflect to lift the contact 220 from the contact 221 thereby interrupting the supply of energy to the heater.

Movement of the limb 218 also causes the extension 230 thereof to pick up the trip lever 234 via one wall of the respective slot 232. This movement causes the trip lever 234 to move over centre with respect to its C-spring mounting, the C-spring then acting to move the trip lever 234 to a position in which the other walls of the respective slots 232 pick up both extensions 230, and moves both respective limbs 218 to an open position in which both sets of contacts are opened. Power cannot be re-supplied to the heater until the trip lever 234 is re-set by a user pushing it over-centre in the opposite direction thereby allowing the contacts to close once again.

During normal operation of the heater, should a user wish to switch the heater off, he or she may move the operating knob from its "on" position so that the side of the slot 232 picks up the extensions 230 of both protectors 202,204, as above, and lifts the contacts 220 from the heater contacts 221.

Thus this embodiment provides a simple double pole protector which can also serve as an on-off switch for the heater. Also, the independent mounting of the actuators allows each to be individually biased into optimal thermal contact with the heater.

Figure 11:
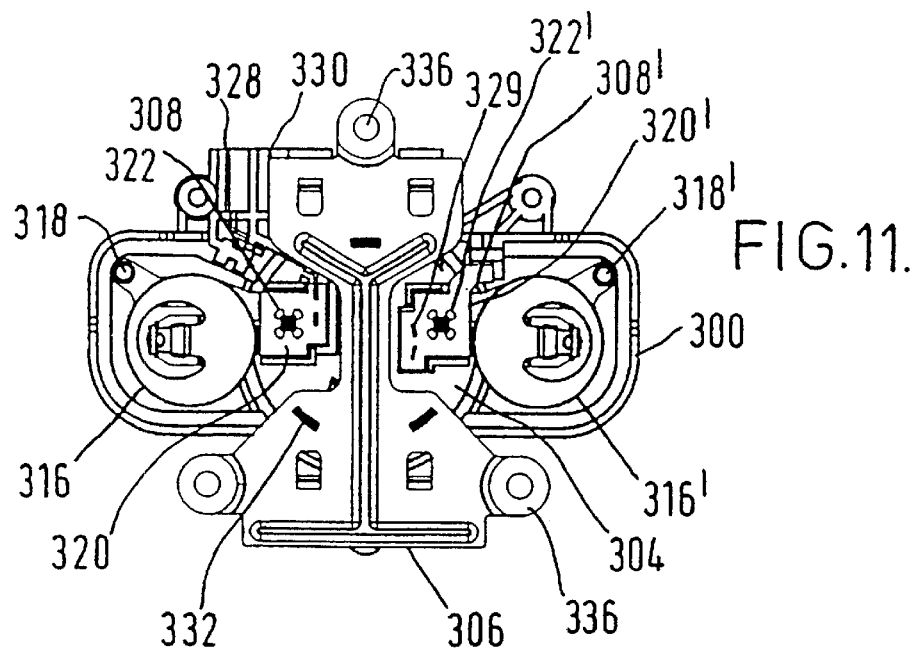
FIG. 11 is a top plan view of a further embodiment of the invention.
Figure 12:
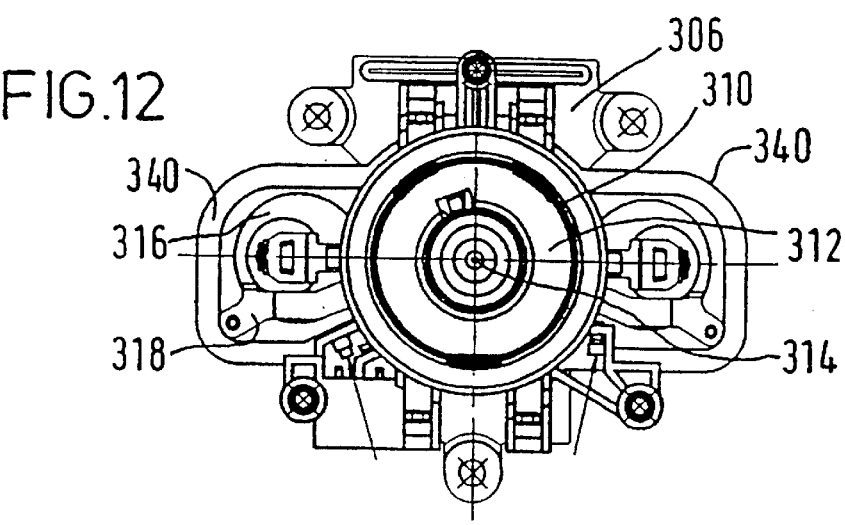
FIG. 12 is a bottom plan view of FIG. 11.
Figure 13:
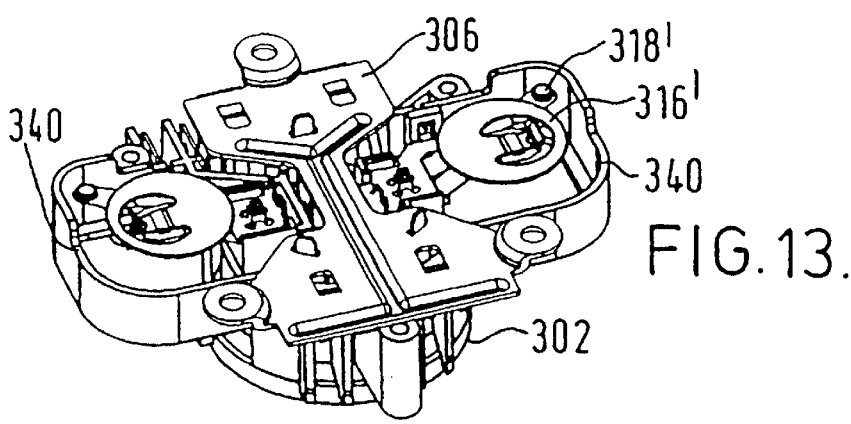
FIG. 13 is a perspective view of the embodiment of FIG. 11.

A further embodiment of the invention will now be described with reference to FIGS. 11 to 13. These Figures show an integrated thermally sensitive control and electrical connector unit for use with a thick film heater in a water heating vessel such as a kettle or hot water jug.

The unit 300 comprises a connector moulding 302 which mounts on its upper surface 304 a mounting plate 306 and two actuator/contact assemblies 308,308'. The connector moulding 302 houses electrical terminals arranged in the same configuration as those disclosed in the Applicants' earlier published application WO95/08024 as used in its commercially available P72 connector. As will be familiar to those skilled in the art, these terminals comprise an annular earth terminal 310, an annular neutral terminal 312 and a line pin 314, all concentrically arranged.

Each actuator/contact assemblies 308, 308 is constructed substantially the same in principle as the assemblies described in the earlier embodiments, the actuator 316,316' and contact 318,318' being mounted on the respective limbs of a generally U-shaped leaf spring member 320,320'. The neutral actuator/contact assembly 308' is push fitted over a spigot 3221 formed on the moulding 302 and is directly electrically connected to the annular neutral terminal 312 of the connector by virtue of receiving tabs 324' which extend from the upper end of the annular neutral terminal 312.

The line side assembly 308 is also mounted on top of the connector moulding over a spigot 322 and is connected to a tab 328 intended to receive a connector of a separate steam switch (not shown). A further tab 330 which is connected to the other side of the steam switch is connected to the line pin 314 by a conductor, not shown.

The mounting plate 306 is attached to the connector moulding 302 by means of tabs 332 which extend upwardly from the earth terminal 310 through the plate and which are then bent over. The mounting plate 306 has three mounting holes 336 for engagement over mounting studs provided on the heater.

It will also be noted that the connector moulding 302 has two wing-shaped extensions 340. These wings 340 are open at top and bottom and serve merely to facilitate handling of the control unit and prevent accidental damage to the actuator/contact assemblies 308,308'.

It will be appreciated that if in use when the unit 300 is mounted over the studs provided on the heater the actuators 316,316' will be brought into good thermal contact with a portion of the heater, and the contacts 318,318' will engage with respective contacts on the heater track. Accordingly, should the heater overheat locally, one or other of the actuators 316,316' will operate, thereby lifting the associated contact 318,318' from the heater in the manner previously discussed thereby disconnecting the power supply to the heater.

A yet further embodiment of the invention will now be described as reference to FIG. 14. This embodiment discloses an adaptation of the unit of FIGS. 11 to 13 intended to incorporate a steam sensitive actuator. To this end the unit 400 comprises a moulding 402 generally similar to the moulding 302 of the earlier embodiment, but including an extension 404 for mounting a spring loaded, pivotally mounted trip lever 406 which is connected to a control knob, (not shown).

The principle of operation of the trip lever 466 is similar to that of the arrangement disclosed in FIGS. 8 to 10. To this end it has, at one end 410 two arms associated with respective actuator/contact assemblies 416,418. Each arm has 412,414, has a portion 421 which extends over the contact mounting leaf spring 420 and another 422 which extends under it. As in the embodiment of FIG. 8, the actuator will operate initially to move the contact spring 420 which then picks up the arm portion 422 of the trip lever 406 which then moves the trip lever 406 over centre, so that the other arm portion 421 will then engage the contact mounting leaf spring 420 to move it fully away from the underlying heater. The contact of the other assembly 416 will also be opened by the trip lever 406, meaning that operation of just one actuator will cause double pole switching.

The moulding extension 404 houses a bimetallic actuator (not shown) which is subjected to steam produced in the liquid heating vessel, which is directed onto the actuator via a steam opening 430 in a manner similar to that disclosed in WO95/34187. When the actuator operates, it will cause the trip lever 406 to move over centre and thus cause the contact carrying leaf spring 420 of both assemblies 416,418 to be picked up by the overlying portions 421 of the respective arms 412,414 and so move the contact thereon away from the heater track.

When the trip arm is reset by a user, then the contact mounting leaf spring 420 will be able to return to its original position under its own resilience.

Figure 14:
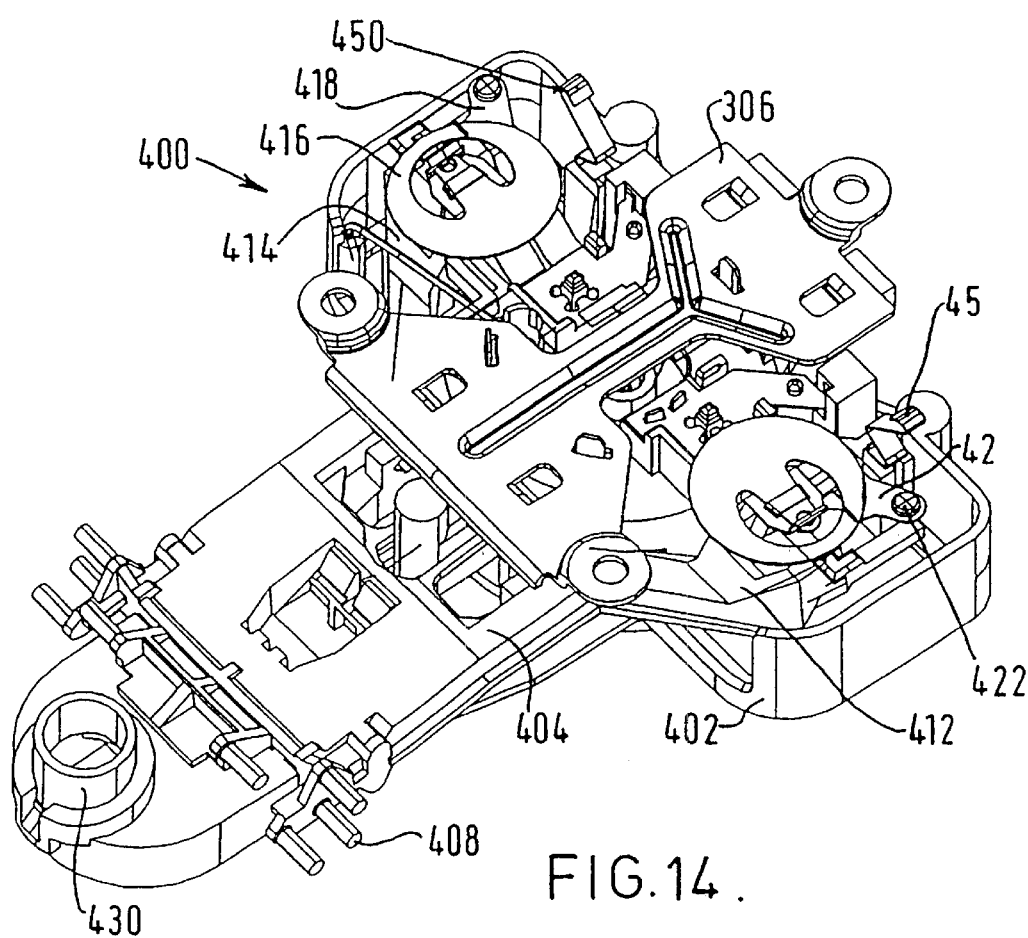
FIG. 14 is a perspective view of a yet further embodiment of the invention.

A further feature of the embodiment of FIG. 14 is that a pair of leaf springs 450 extend from the unit for engagement with contact locations provided on the heater. These leaf springs are connected, at the other side of the control by suitable connectors, to a neon indicator which indicates when the track is being energised. In the event that the power to the track is interrupted by operation of the steam or overheat actuators, no power will be supplied to the heater, which means that the neon, whose only source of power is from the heater, will be extinguished.

Figure 15:
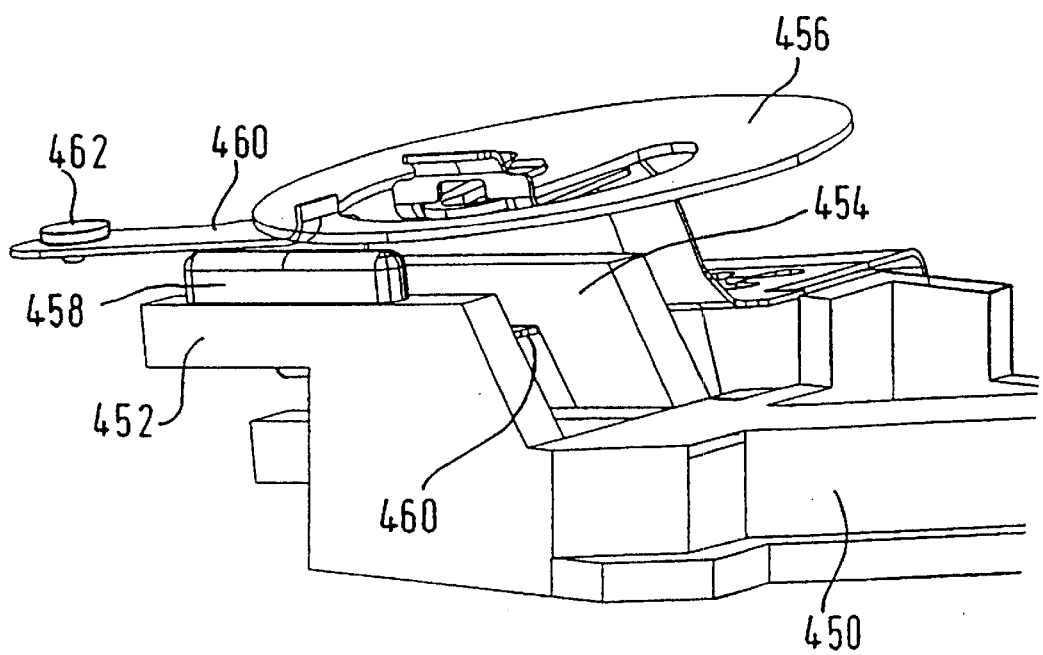
FIG. 15 is a detail of a modification of the embodiment of FIG. 14.

In the modification of the embodiment of FIG. 14 shown in FIG. 15, each side of the trip lever end 450 has two arms 452, 454, both of which are arranged under the bimetallic actuator 456. The arm 452 has a rib 458 which is positioned under the actuator 456, and the other arm 454 extends over the leaf spring 460 mounting the contact 462. In this arrangement the actuator 456 will, after operation, act initially on the rib 458 so as to start pivoting the trip lever over centre. That movement will cause the second arm 454 to pick up the leaf spring 460 and so move the contact 462 out of contact with the heater track. This arrangement has the advantage that it makes maximum use of the movement and force generated by the actuator 456. Of course, it may be possible that the actuator 456 will still impact on the spring 460, depending on the particular position of the spring relative to the actuator.

It will be appreciated that the invention may be applied to a whole range of products such as liquid heating vessels, such as kettles and jugs, coffee makers, deep fat fryers and so on.

Also, it will be appreciated that various changes may be made to the embodiments described above without departing from the scope of the invention. For example, while the second embodiment has been described as double pole overheat protector, one of the actuators may be chosen to have an operating temperature such that it acts as a simple thermostat, cycling the power supply to the heater. In that case, no trip lever mechanism is associated with the actuator. However, the other actuator may still act as an overheat protector, being chosen to operate at a higher temperature, and if desirable, a trip lever mechanism may still be associated with that actuator. That trip lever may, however be arranged to open the set of contacts associated with the cycling thermostat, thereby providing a double pole cut-out.

What is claimed is:

1. A thermally sensitive control for a thick film electric heater comprising a bimetallic actuator arranged for making good thermal contact with the heater, and a movable electrical contact for engagement with a contact provided on the heater, said movable contact being operatively coupled to the bimetallic actuator such that in use upon operation of the actuator, it moves out of engagement with the heater contact to interrupt the electrical supply to the heater, said bimetallic actuator and said movable contact being mounted on common leaf spring means which act in use resiliently to bias the actuator into thermal contact with the heater and the movable contact into electrical contact therewith.

2. A control as claimed in claim 1 wherein said leaf spring means comprises a leaf spring having at least two connected limbs mounting respectively the actuator and contact.

3. A control as claimed in claim 2 wherein said leaf spring member is generally U-shaped, with the contact and actuator mounted on the respective side limbs of the U.

4. A control as claimed in claim 2 or 3 wherein the limb mounting the contact member is arranged to overlap a movable portion of the actuator.

5. A control as claimed in claim 4 wherein the contact carrying limb comprises a folded up tab for engagement with the actuator.

6. A control as claimed in claim 1 wherein the actuator is a snap acting actuator.

7. A control as claimed in claim 1 wherein said leaf spring member is provided with a terminal for connection to an external power supply.

8. A control as claimed in claim 1 wherein the leaf spring member is mounted in a control housing for mounting to the vessel or heater.

9. A control as claimed in claim 1 wherein said actuator causes movement of a spring loaded trip lever which acts to keep the contact open until reset.

10. A control as claimed in claim 1 wherein said control constitutes an overheat protection means for the heater, operable in the event that the heater overheats.

11. A control as claimed in claim 10 comprising a pair of actuators mounted on respective spring means.

12. A control as claimed in claim 10 further comprising thermostatic control means for heating liquid in the vessel to a desired temperature.

13. A control as claimed in claim 12 wherein said thermostatic control comprises a creep action bimetallic actuator mounting an electrical contact which in use makes contact with a contact provided on the heater, such that in use when liquid in the vessel reaches a predetermined temperature, the actuator deflects to such an extent to lift the actuator contact from the heater contact.

14. A control as claimed in claim 13 further comprising means for varying the operating temperature of the thermostatic control.

15. An assembly for use in a thermally sensitive control for a thick film electric heater, the assembly comprising a snap acting bimetallic actuator, and a movable electrical contact, said bimetallic actuator and said contact being mounted on common leaf spring means which in use act to resiliently to bias the actuator into thermal contact with the heater and the movable contact into electrical contact therewith.

16. An assembly as claimed in claim 15 wherein said leaf spring means comprises a leaf spring having at least two connected limbs mounting respectively the actuator and contact.

17. An assembly as claimed in claim 16 wherein said leaf spring member is generally U-shaped, with the contact and actuator mounted on the respective side limbs of the U.

18. An assembly as claimed in claim 16 the limb mounting the contact member is arranged to overlap a movable portion of the actuator.

19. An assembly as claimed in claim 18 wherein the contact carrying limb comprises a upwardly folded tab for engagement with the actuator.

20. An assembly as claimed in claim 17 wherein said leaf spring means is provided with a terminal for connection to an external power supply.

21. A thermally sensitive control for a thick film electric heater comprising a bimetallic actuator arranged for making good thermal contact with the heater, and a movable electrical contact for engagement with a contact provided on the heater, said movable contact being operatively coupled to the bimetallic actuator such that in use upon operation of the actuator, it moves out of engagement with the heater contact to interrupt the electrical supply to the heater, said bimetallic actuator and said movable contact being mounted on commonly mounted leaf spring means which act in use resiliently to bias the actuator into thermal contact with the heater and the movable contact into electrical contact therewith.

22. An integrated electrical connector and control unit for a thick film electric heater comprising an electrical connector having a connector body housing terminals for engagement with terminals in a complementary connector and, mounted on top of said connector body, and extending laterally therefrom, a leaf spring mounting a contact for making electrical connection to the heater, and a bimetallic actuator for making good thermal contact with the heater.

23. A unit as claimed in claim 22 wherein said bimetallic actuator is spring mounted.

24. A unit as claimed in claim 23 wherein said actuator and said contact are mounted on common spring means.

25. An assembly as claimed in claim 17 wherein the limb mounting the contact member is arranged to overlap a movable portion of the actuator.

26. An assembly as claimed in claim 25 wherein the contact carrying limb comprises a upwardly folded tab for engagement with the actuator.

\* \* \* \* \*

UNITED STATES PATENT AND TRADEMARK OFFICE
CERTIFICATE OF CORRECTION

PATENT NO. : 6,472,646 B1
DATED : October 29, 2002
INVENTOR(S) : John Crawshaw Taylor It is certified that error appears in the above-identified patent and that said Letters Patent is hereby corrected as shown below:

<u>Title page,</u>
Item [57], ABSTRACT,
Line 15, after "end" please insert -- thereof --.

<u>Column 14,</u>
Line 4, after "16" please insert -- wherein --.

Signed and Sealed this

Twenty-fifth Day of February, 2003

JAMES E. ROGAN
*Director of the United States Patent and Trademark Office*